United States Patent
Albright et al.

(10) Patent No.: US 6,895,549 B1
(45) Date of Patent: May 17, 2005

(54) METHOD AND APPARATUS FOR GENERATING A VARIABLE DATA FILE TO BE USED TO GENERATE CUSTOM PRINTED ARTICLES

(75) Inventors: Jason R. Albright, Louisville, CO (US); Carol L. Dwyer, Longmont, CO (US); Kyle P. Manning, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 09/702,919

(22) Filed: Oct. 27, 2000

(51) Int. Cl.$^7$ .............................................. G06F 17/00
(52) U.S. Cl. ...................... 715/500; 715/517; 715/523; 101/2; 101/494
(58) Field of Search .............................. 715/500, 501.1, 715/505–507, 517, 523, 500.1; 101/2, 494; 705/1; 358/1.18, 1.9; 400/61, 76

(56) References Cited

U.S. PATENT DOCUMENTS

| | | |
|---|---|---|
| 3,966,534 A | 6/1976 | Oddy |
| 4,408,906 A | 10/1983 | Wallace |
| 4,939,674 A * | 7/1990 | Price et al. .................. 358/1.9 |
| 5,262,804 A | 11/1993 | Petigrew et al. |
| 5,315,508 A | 5/1994 | Bain et al. |
| 5,401,110 A | 3/1995 | Neeley |
| 5,464,289 A | 11/1995 | Beaudry |
| 5,467,433 A * | 11/1995 | Lamprecht et al. ........ 358/1.15 |
| 5,621,864 A * | 4/1997 | Benade et al. ............. 358/1.18 |
| 5,768,675 A | 6/1998 | Estabrooks |
| 6,505,980 B1 * | 1/2003 | Allday ........................ 400/61 |

FOREIGN PATENT DOCUMENTS

| | | |
|---|---|---|
| JP | 5050696 | 3/1993 |
| JP | 7088981 | 4/1995 |
| JP | 7089178 | 4/1995 |
| JP | 8156148 | 6/1996 |

* cited by examiner

*Primary Examiner*—Joseph Feild
*Assistant Examiner*—Paul Nguyen-Ba
(74) *Attorney, Agent, or Firm*—Scott W. Reid; Stephen Bongini; Fleit, Kain, Gibbons, Gutman, Bongini & Bianco P.L.

(57) ABSTRACT

A method is provided for generating a variable data file to be used to generate custom printed articles. A template including a plurality of tokens is read, and a data structure including a plurality of printed article ID's is generated. A record in a database is identified using a first printed article ID, and data is extracted from a field of the record which is specified by a first token in the plurality of tokens. The data is outputted to the variable data file. In a preferred embodiment, an index is incremented to point to a second printed article ID in the data structure in response to reading a second token in the template. Also provided is a system for producing custom printed articles.

16 Claims, 15 Drawing Sheets

METHOD AND APPARATUS FOR GENERATING A VARIABLE DATA FILE TO BE USED TO GENERATE CUSTOM PRINTED ARTICLES

FIELD OF THE INVENTION

The invention pertains to generating printed articles. More specifically, the invention pertains to a method and apparatus for generating custom printed articles on demand.

BACKGROUND OF THE INVENTION

Currently, there is an interest on the part of manufacturing concerns in providing customers with a greater variety of selectable attributes of purchased goods. However, this must be done without unduly extending the interval between the time at which an order is placed, and the good delivered. Keeping large inventories of products with all the possible combinations of selectable attributes is not a good solution to the problem for at least the following reasons: (1) it may be difficult to accurately forecast user demand for particular combinations of attributes (this is especially problematic in the case of products having a finite shelf life) and (2) large inventories engender a commensurate tax burden. To address the interest, manufacturers are striving to develop more efficient manufacturing systems for building products to order.

One aspect of manufacturing systems that must be addressed is the printing of packaging labels and other printed articles which are dependent on the specific set of attributes which has been selected for a given product.

In conventional packaging operations, labels which all contain the same printed matter, are typically printed in bulk for application to products and/or product packaging. In printing duplicate labels in large quantities, printing or finishing (e.g., cutting or coating) errors increase costs but are not problematic for the overall manufacturing system. However, if each label is customized for a particular product order, or if there is a small set of identical labels corresponding to a product order, then print errors can cause delays in other packaging processes that use the printed labels, and delays in shipping product.

In industrial settings, labels are usually printed from label stock that comes in the form of a web. Producing the labels, generally involves feeding the web through two or more separate web fed system (e.g., a print line, and a cut and coat line). Setting up each web fed system requires threading a length (known as a 'leader') of the web manually, in order to engage the web in a feed mechanism. The leader will not be fully processed by the web fed system and is therefore unuseable. This loss of a small number of labels on the leader portion is acceptable if mass quantities of duplicate labels are being produced. However, if the label is used in a build-to-order manufacturing system in which each label is intended for a specific order, then this loss of labels in the leader portion is not acceptable.

Additionally, in the operation of a printer or printed material coating, and cutting line some errors will unavoidably occur. This is problematic for an order specific printed material generating system, in which each label may be customized.

Depending on the size of label required, labels can be printed in more than one column on a web. Labels may be grouped in orders, which have varying lengths. Due to the differing lengths an arrangement of orders on the web in an ad hoc sequence can result in excessive white space, which is tantamount to waste.

Further, in a highly automated system for producing labels, it is desirable to allow the layout of labels to be changed without having to rewrite programs in which formatting information is coded.

What is needed is a method and apparatus for generating order specific printed materials in a high volume production environment.

SUMMARY OF THE INVENTION

The present invention provides methods of generating a variable data file to be used to generate custom printed articles. In one embodiment, a template including a plurality of tokens is read, and a data structure including a plurality of printed article ID's is generated. A record in a database is identified using a first printed article ID, and data is extracted from a field of the record which is specified by a first token in the plurality of tokens. The data is outputted to the variable data file. In a preferred embodiment, an index is incremented to point to a second printed article ID in the data structure in response to reading a second token in the template. Also provided is a system for producing custom printed articles.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It should be understood that the embodiments presented below are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Network

Although the invention is discussed herein below with reference to labels, it should be understood that the invention is applicable to other types of printed articles as well.

Figure 1:
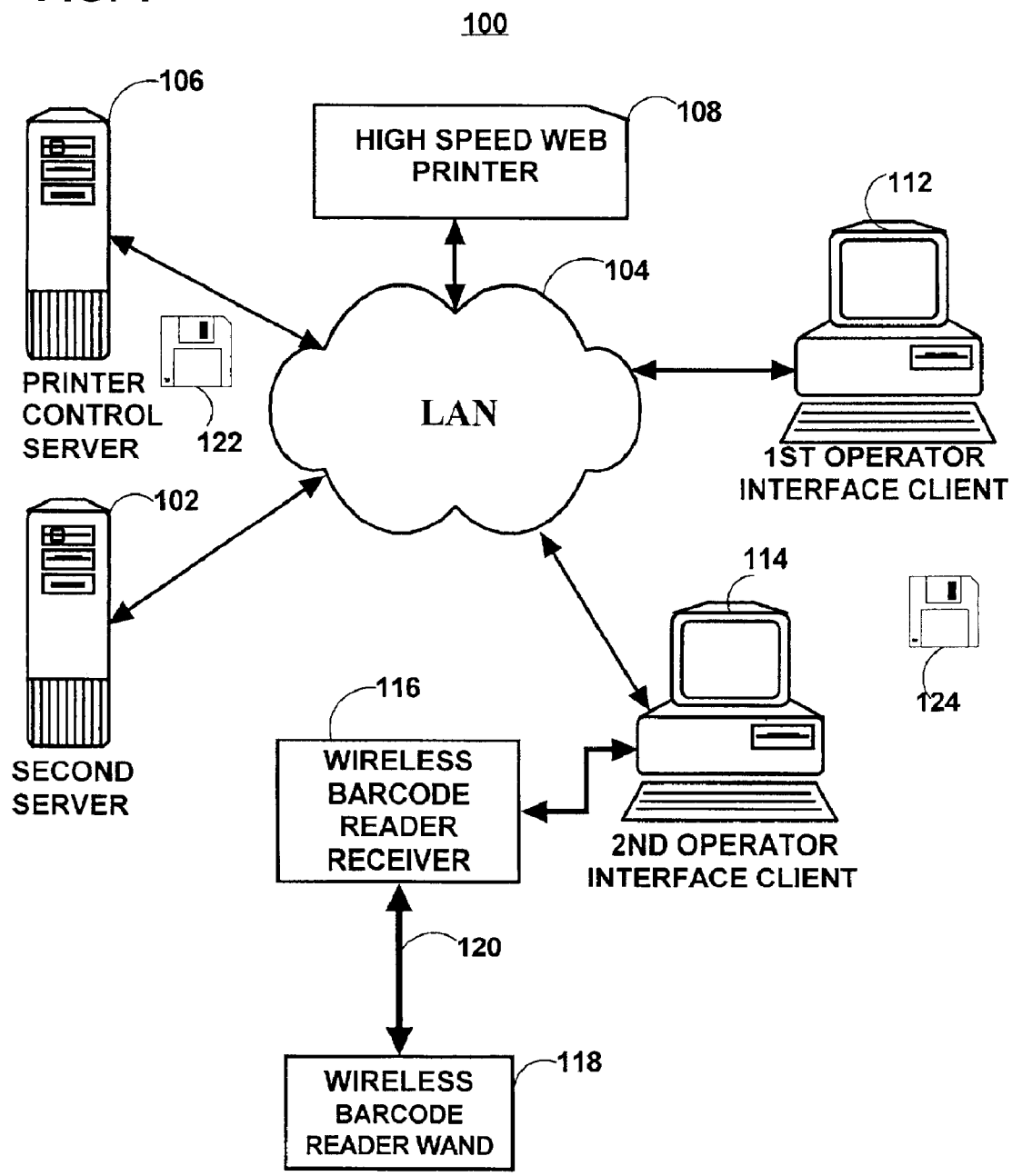
FIG. 1 is a schematic of a computer network according to a preferred embodiment of the present invention.

FIG. 1 is a schematic of a computer network 100 according to a preferred embodiment of the invention. Referring to FIG. 1, a second server 102 is electrically coupled to a Local Area Network (LAN) 104. The LAN 104 is preferably an ethernet LAN. The second server 102 processing a business's orders for goods, and generates multiple orders for labels to be printed, corresponding to orders for goods. The second server 102 also performs other processing functions that are outside the scope of the present invention. A printer controller server 106 is also electrically coupled to the LAN 104. The printer controller server 106, prepares print jobs of labels for printing and performs other functions described hereinafter. A high speed printer 108 is electrically coupled to the LAN 104. The high speed printer 108 prints on print media which preferably includes web label stock. A first operator interface client computer 112 is electrically coupled to the LAN 104. The first client computer 112 can be positioned near a first station for processing the print media (e.g., near the high speed web printer 108). A second operator interface client computer 114 is electrically coupled to the LAN 104. A wireless bar code reader receiver 116 is electrically coupled to the second client computer 114. The wireless bar code reader receiver 116 is preferably a wedge and is electrically coupled to the keyboard socket of the second client computer 114. A wireless bar code reader wand 118 is electrically coupled to the wireless bar code reader receiver 116 (e.g. wirelessly).

A first computer readable medium 122 in the form of 3.5" diskette is provided for loading software onto the printer control server 106 to configure it to perform processes according to the present invention that are described below with reference to the figures. A second computer readable medium 124 also in the form of a 3.5" is provided for loading software onto the first and second client computers to configure them to perform functions including relaying information received from the wand 118 to the printer control server 106 (as discussed below with reference to flow diagrams shown in the FIGS.)

In one embodiment, the second server 102, and printer control server 106 are RS/6000 Power PC computers manufactured by IBM (Armonk, N.Y.). The first and second client computers 112 and 114 illustratively are IBM PC compatible personal computers. The servers 102 and 106 run the IBM AIX operating system. The client computers 112, and 114 can run Microsoft Windows NT. The clients 102, and 106 and servers 112 and 114 conventionally comprise motherboards including microprocessors, read only memory (ROM) and random access memory (RAM) that are electrically coupled through a digital signal bus, and video cards, network interface cards (e.g., ethernet cards), a hard disk, removable media drives, keyboard, and a pointing device (e.g., mouse).

Web Print Line

Figure 2:
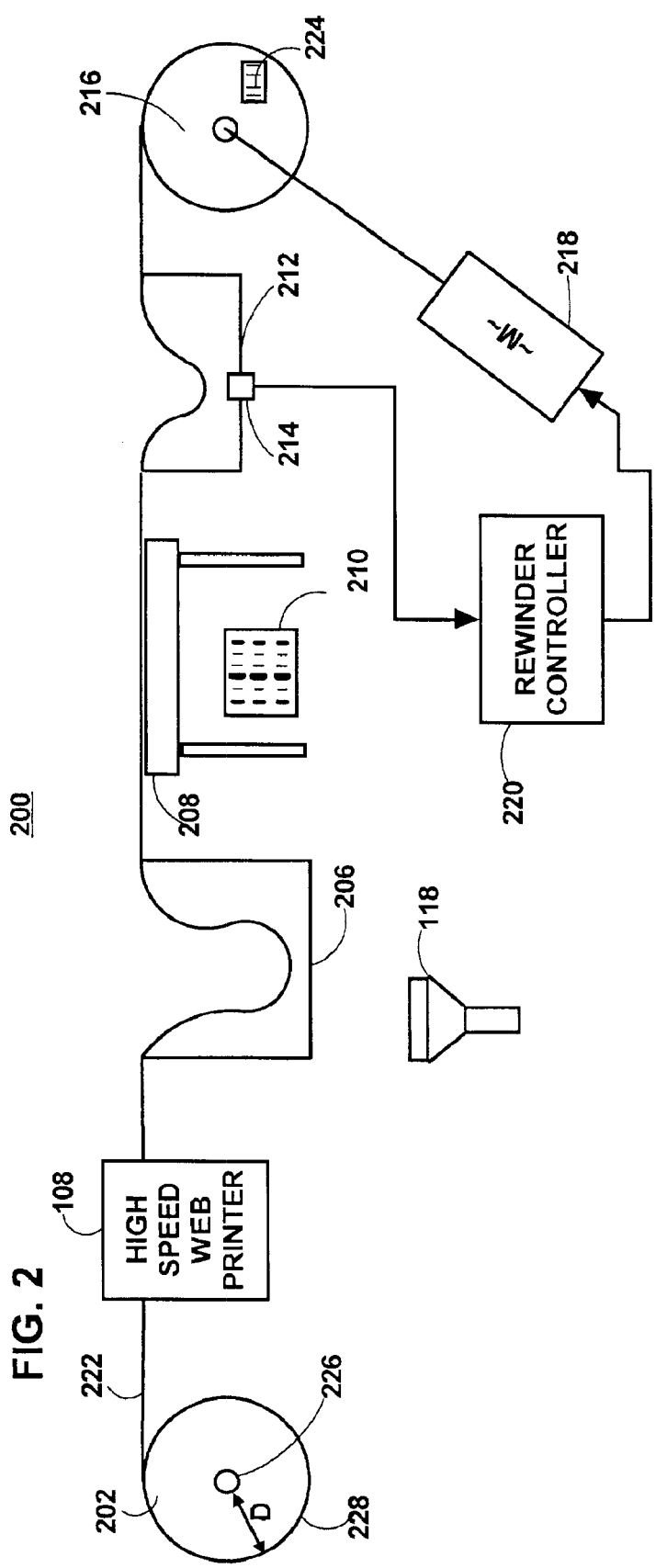
FIG. 2 is a schematic of a web printing line according to a preferred embodiment of the present invention.

FIG. 2 is a schematic of a web printing line 200 according to a preferred embodiment of the invention. Referring to FIG. 2, a print media web 222 is taken off a supply roll 202, and run through a high speed web printer 108. The web 222 then runs through a first accumulator 206. The first accumulator 206 is preferably capable of accumulating at least the length of web 222 printed in one minute, and more preferably the amount of web 222 printed in ten minutes. The web 222 then runs over an inspection station 208, which illustratively takes the form of a table. This allows an operator to check the quality of printing on the web periodically. Each label printed on the web 222 preferably comprises a unique bar code which the operator can use to identify each label. Upon inspecting a label, the operator scans the bar code on the label using the wireless bar code reader wand 118. The operator can then select from a number of system function bar codes affixed to a first palette 210 in the vicinity of the inspection table. A plurality of function bar codes on the first palette can for example identify specific types of printing errors which the operator observed. The wand 118 generates wireless signals in response to reading the unique label bar code and a function bar code. The wireless signals are received by the receiver 116, and other signals derived therefrom are transmitted to the first operator interface client 114. The first client operator interface then transmits still further signals to the printer control server 106 based on the other signals. The printer control server 106 then records the identity of the label checked and information relative to a result of the inspection based which was input by scanning the function bar code. A particular function bar code can indicate a label met inspection, i.e. that the label is good.

The web 222 then runs through a catenary support 212, which is equipped with a sensor 214 for sensing the droop of the web 222. The web 220 then runs onto a take up spool 216, which is driven by a rewind motor 218. The rewind motor is controlled by a rewinder controller 220, which receives input from the sensor 214. The take up spool 216 has a spool ID bar code label 224.

Web Coat-Cut Line

Figure 3:
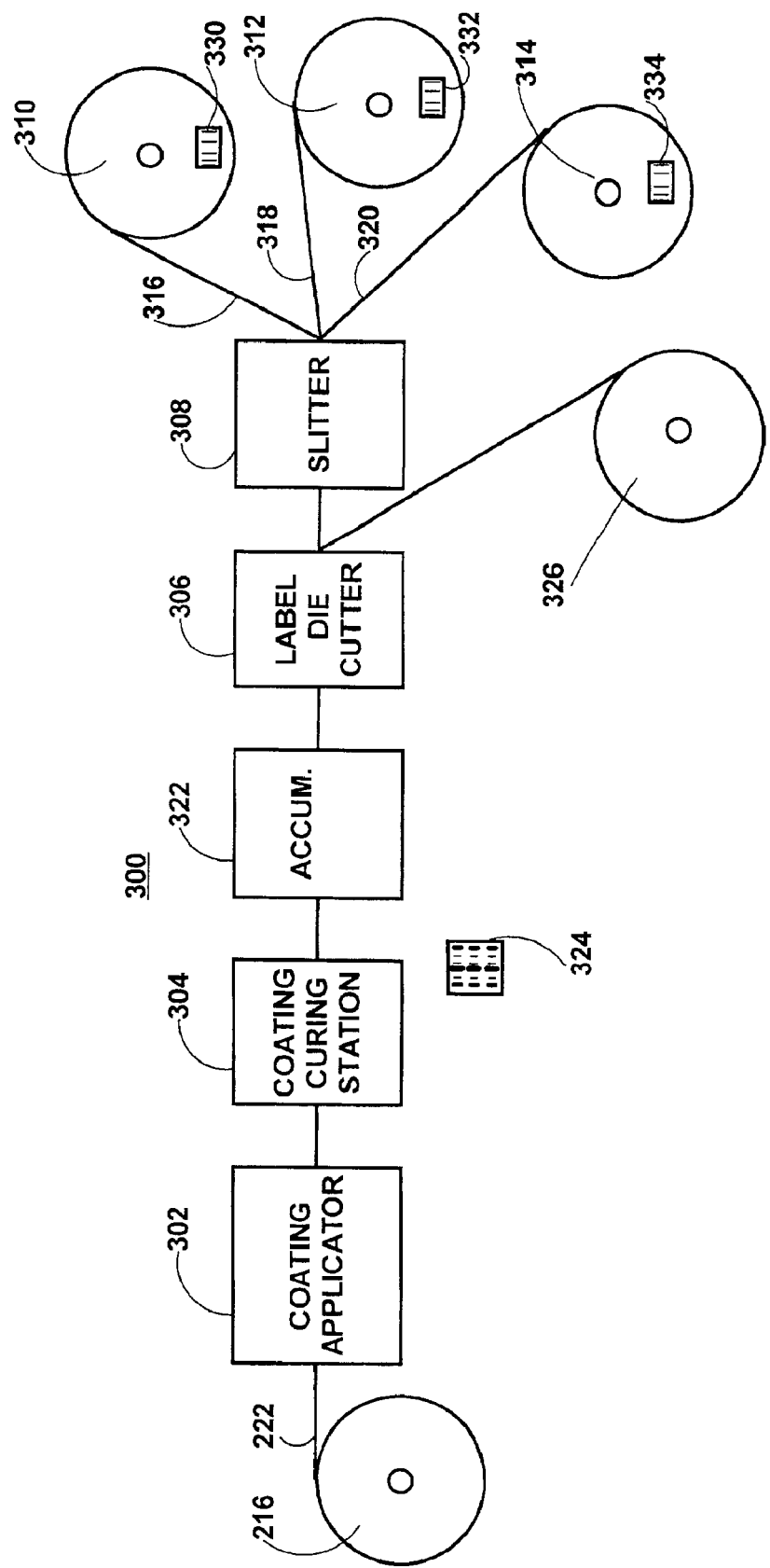
FIG. 3 is a schematic of a web coat-cut line according to a preferred embodiment of the present invention.

FIG. 3 is a schematic of a web coat-cut line 300 according to a preferred embodiment of the invention. Referring to FIG. 3, the web 222 is unrolled from the take up spool 216 and runs through a coating applicator 302 (preferably a doctor blade type coating applicator), a coating curing station 304 (preferably a UV curing station), a second accumulator 322, a label die cutter 306, and a slitter 308. The slitter 308 slits the web 222 into three sub webs 316, 318, and 320, which are taken up on three reels 310, 312, and 314, respectively. Each of the reels 310, 312, and 314 bears a reel ID bar code 330, 332, and 334 respectively. A matrix take up spool 326 is provided for taking up unused label material, (termed matrix) which surrounds labels and is severed from label areas by the label die cutter 306. A second palette 324 bears a number of bar codes for indicating that specific labels identified by scanning their bar codes have passed an inspection, or failed for a particular reason corresponding to a particular bar code on the second palette 324. Error information related to errors on the coat-cut lines can be communicated back to the printer control server 106 for recording.

Figure 4A:
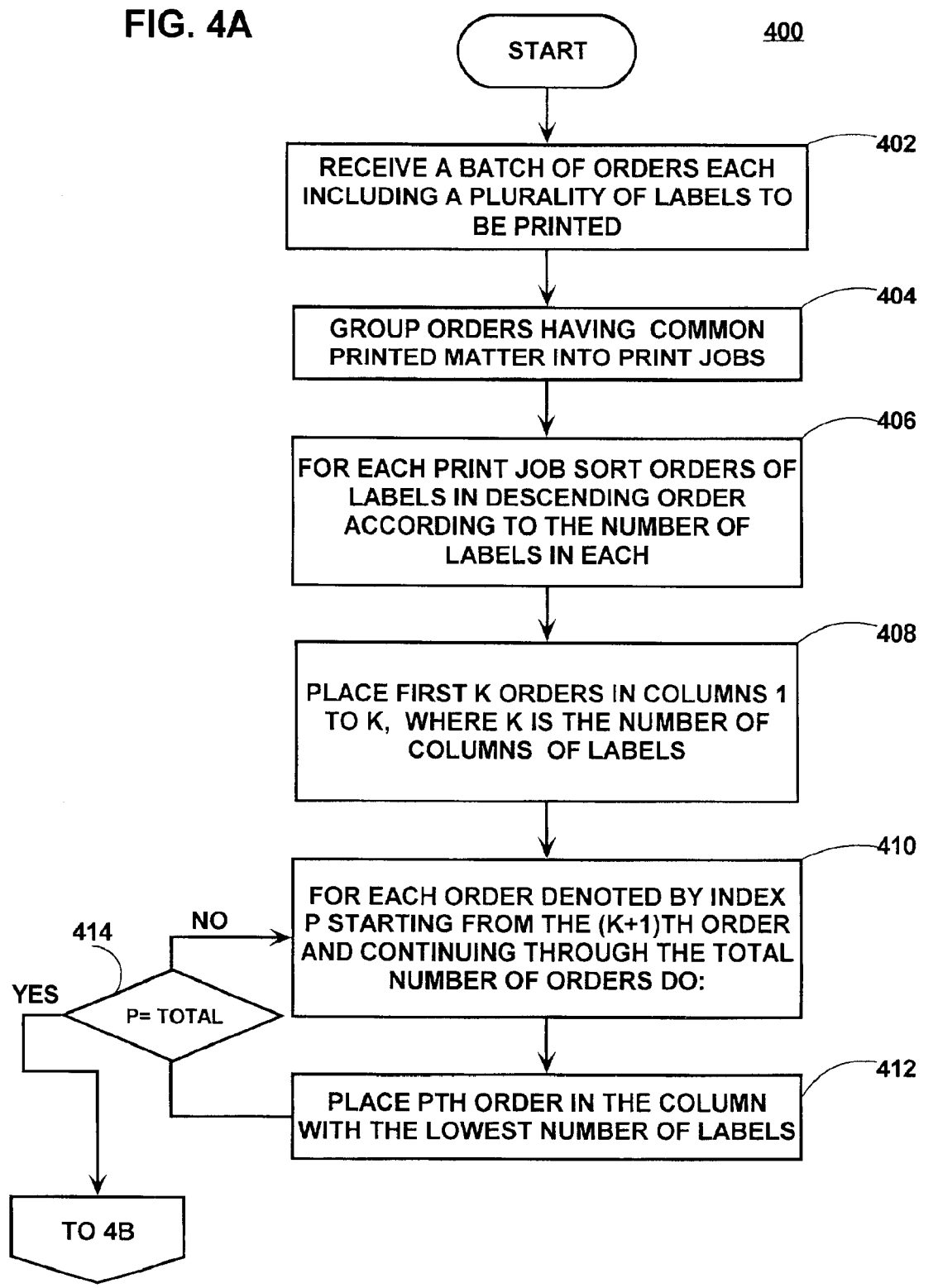
FIG. 4A is a first part of a flow chart of an order arranging process performed by the printer control server shown in FIG. 1 according to a preferred embodiment of the present invention.
Figure 4B:
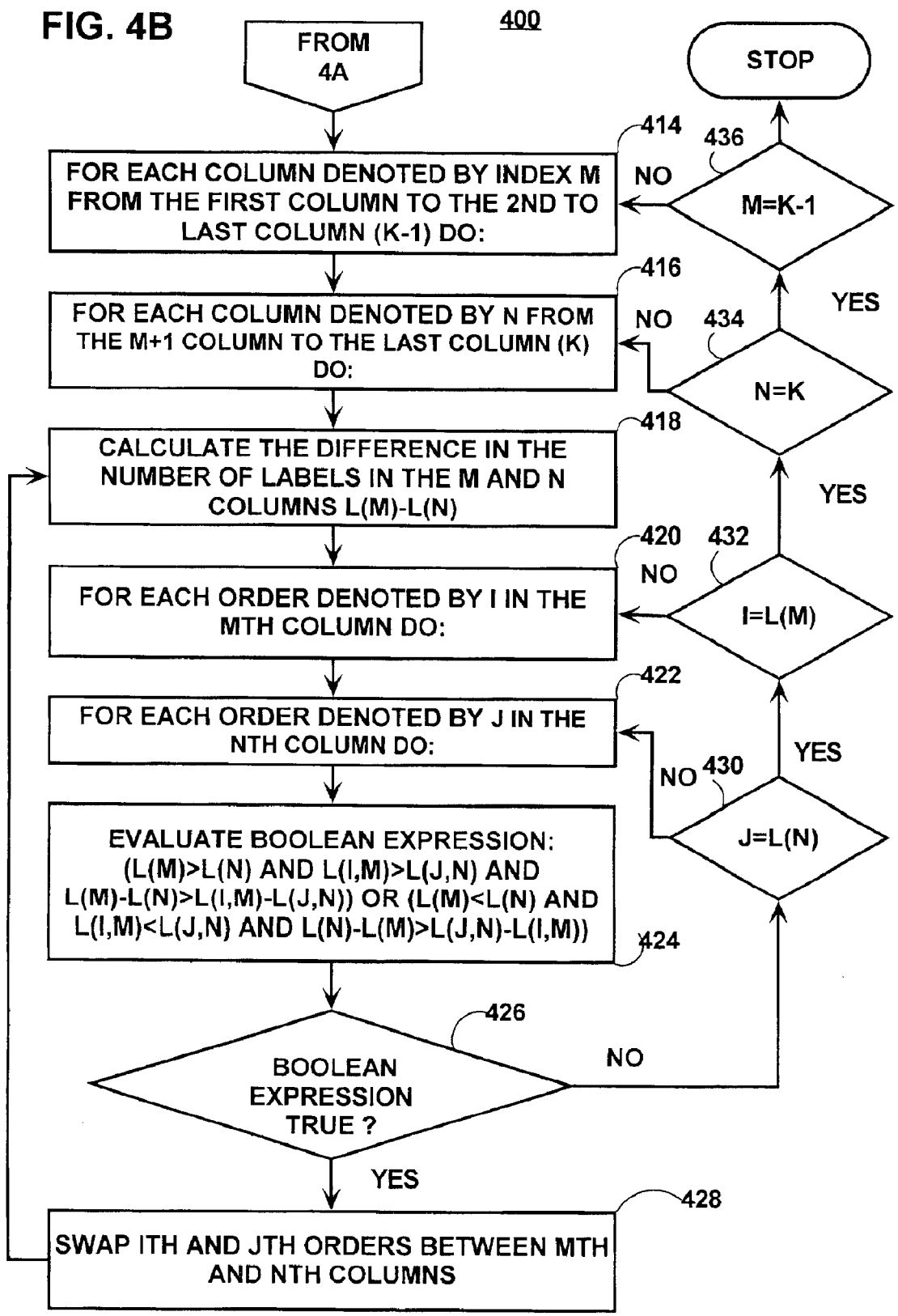
FIG. 4B is a second part of the flow chart shown in FIG. 4A.

Organizing Labels within Print Jobs to Minimize Blank Space in Multi Column Printing FIGS. 4A and 4B are flow charts of a process 400 performed by the printer control server 106 shown in FIG. 1 according to a preferred embodiment of the invention. This process 400 serves to optimize utilization of the web by reducing blank space.

Referring to FIG. 4, in process block 402 a batch of orders each of which includes a plurality of labels is received by the printer control server 106 from the second server 102. Each order consists of one or more labels that have printed matter in common (e.g., common graphics, and/or common text). Multiple orders also have common printed matter. Although labels within one or more orders have printed matter in common, each also has other printed matter that is customized for each specific label. The common matter can include for example the name of a retailer, a store logo or a background design. The custom printed matter can include, for example, the name of the customer, and their prescription information (in the case that the label is for a prescription product such as contact lenses).

Figure 5:
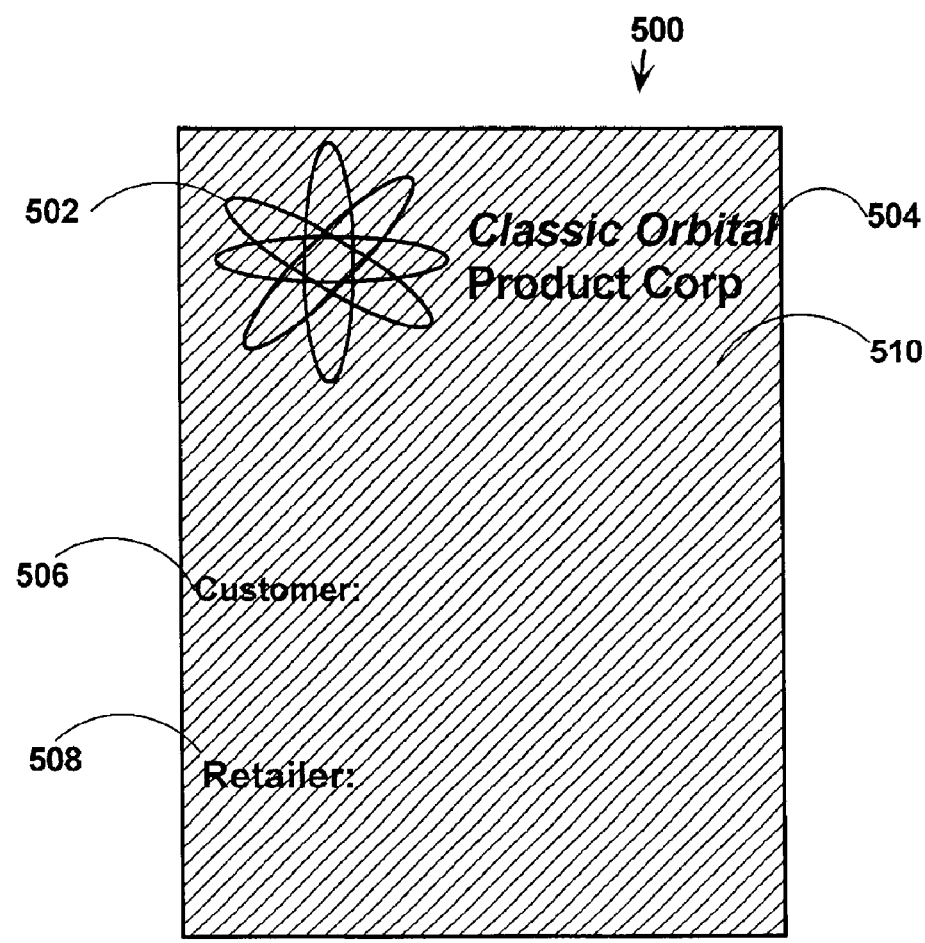
FIG. 5 is an illustration of a label showing only printed matter common to a plurality of labels.

FIG. 5 is an illustration of a label 500 showing only printed matter common to a plurality of labels. The label 500 includes a company logo graphic 502, company name text 504, the word 'Customer' 506, and the word 'Retailer' 508. Note that this label also has a particular cross hatched background design 510. Multiple orders can be grouped into a print job based on commonality of the attributes (e.g., based on having the printed matter shown in FIG. 5 in common).

Figure 6:
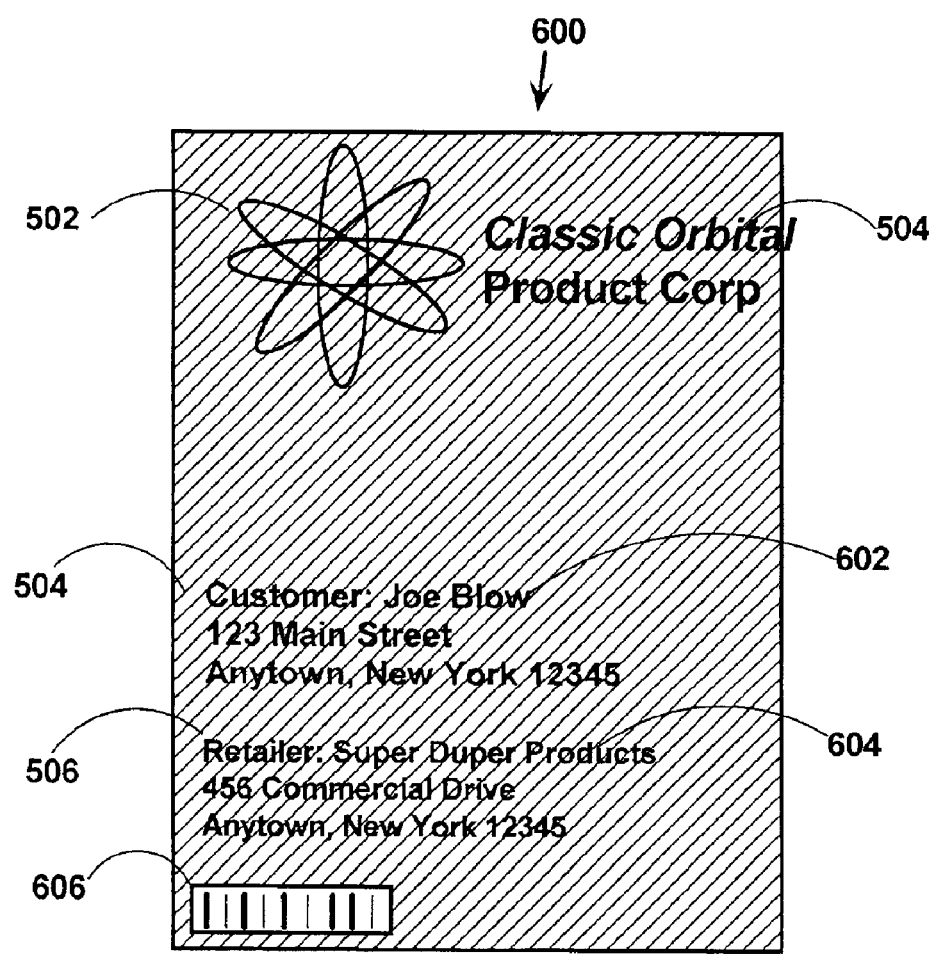
FIG. 6 is an illustration of a label showing printed matter that is specific to the illustrated label, along with the printed matter shown in FIG. 5.

FIG. 6 is an illustration of a label 600 showing printed matter that is unique to the label, along with the common printed matter shown in FIG. 5. The printed matter that is customized for the specific label 600 includes a specific customer name and address 602, a retailers name and address 604 and a bar code 606. The bar code is a unique ID for the label. If a given label must be reprinted, the bar code on the reprint is distinct from the bar code on the original. Having unique bar codes on each label allows the labels to be identified during inspection. The retailer name may be common to labels within a specific order, but need not be common among different orders within a print job.

Referring again to FIG. 4A, in process block 404, orders having common printed matter are grouped together into print jobs. In process block 406, within each print job, orders are sorted in descending order according to the number of labels they contain. The web 222 is preferably sized to fit more than one label across, so that labels will be printed in a plurality of columns. In process block 408, the first K orders in the sorted arrangement of orders in each print job (where K is the number of columns of labels) are assigned to leading positions in columns 1 to K.

Process block 410 begins a FOR loop which successively selects each successive order in the sorted arrangement of orders. In process block 412, each successive order in the sorted arrangement is placed in one of the columns among the set of columns 1 to K, which at the time of the iteration of block 412 has the lowest total number of labels.

Figure 7:
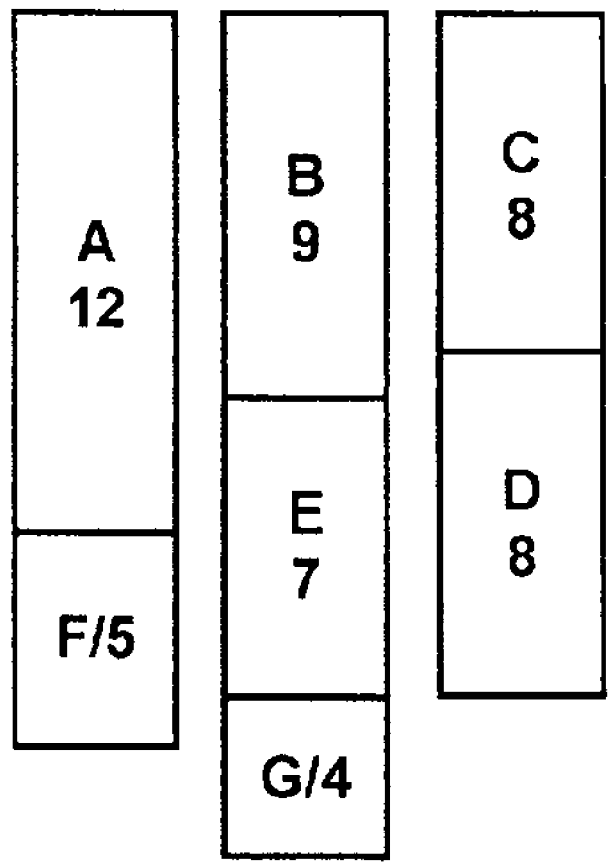
FIG. 7 is a schematic representation of an arrangement of orders at a stage in the process of FIGS. 4A–4B.

FIG. 7 illustrates a multi column arrangement 700 of orders generated by executing process blocks 410, and 412 on a sorted arrangement of seven orders. In this arrangement the letters indicate the sequence in which the seven orders were placed in the sequence, and the numbers indicate the number of labels in each order. There are three columns in the arrangement. The total number of labels in the three columns is 17, 20, and 16. Printing labels in this arrangement will result in (20−17)+(20−16)=7 wasted blank label spaces. This is low but can be reduced further. The arrangement of orders that is graphically depicted in FIG. 7, can be stored in a memory as an 'order array' which has a number of columns equal to the number of columns in which printed articles are to be printed, and a number of rows equal to at least the maximum of the orders in a column. Each element in the order array has an order ID. Each order can also be associated (e.g., by order ID) with a one dimensional 'order-label' array which has a separate entry (row) for each label in the order. Each entry identifies the label by a unique label ID. The unique label ID is correlated to the bar code printed on the label. In the case of other types of printed articles a 'printed article ID' takes the place of the 'label ID', and a 'printed article group ID' takes the place of 'order ID'.

The remainder of process 400 shown in FIG. 4B serves to identify exchanges of orders that can be performed in order to better balance (equalize) the number of orders in the K columns. For example with reference to FIG. 7, the order labeled E in the second column can be exchanged with order labeled F in the first column. Doing so will yield three column lengths of 19, 18, and 16. Printing labels in this arrangement will result in (19−18)+(19−16)=4 wasted blank label spaces, which is less than the number (7) wasted with the previous arrangement. Process block 414 is the beginning of an outer do loop which indexes through the columns starting from the first and ending with the next to last (K-1). The index incremented by the outer do loop which indicates a column number is 'M'. Process block 416 is the beginning of a second do loop which is nested within the outer do loop, and indexes through columns starting with the M+1 column and ending with the last (K) column. The index incremented by the second do loop which indicates a column number is 'N'. In process block 418, the difference between the total number of labels in the Mth column, and the total number of labels in the Nth column is calculated. The difference is denoted L(M)−L(N) where L(M) is the number of the orders in the Mth column, and L(N) is the number of orders in the Nth column. Process block 420 is the beginning of a third do loop which is nested within the second do loop, and indexes through the orders in the Mth column. The index increment by the third do loop which indicates the order number is 'I'. Process block 422 is the beginning of a fourth do loop which is nested within the third do loop, and indexes through the orders in the Nth column. The index incremented by the fourth do loop which indicates the order number is J. In process block 424 the following boolean expression is evaluated $$(L(M){>}L(N) \text{ AND } L(I,M){>}L(J,N) \text{ AND } L(M){-}L(N){>}L(I,M){-}L(J,N))$$
$$\text{OR } (L(M){<}L(N) \text{ AND } L(I,M){<}L(J,N) \text{ AND } L(N){-}L(M){>}L(J,N){-}L(I,M))$$

where L(M) is the number of labels in the Mth column,

L(N) is the number of labels in the Nth column,

L(I,M) is the number of labels in the Ith order of the Mth column, and

L(J,N) is the number of labels in the Jth order of the Nth column.

Process block 426 is a decision block the outcome of which depends on whether the boolean expression evaluated in process block 424 is TRUE. If TRUE then the process 400 continues with process block 428 in which the Ith and Jth orders are swapped between the Mth and Nth columns, after which the process 400 loops back to process block 418. If the outcome of decision block 426 is FALSE then the process 400 continues with the fourth do loop termination test 430. If in decision block 430 the fourth loop index J is found to be not equal to L(N) then the process loops back to beginning of the fourth do loop 422. If on the other hand J is found to be equal to L(N) then the process 400 continues with process block 432 which is the third do loop termination test. If in process block 432 I is found to be not equal to L(M), then the process 400 loops back to the beginning of the third do loop 420. If on the other hand I is found to be equal to L(M) then the process continues with process block 434 which is the second do loop termination test. If in process block 434 N is not found to be equal to K, then the process loops back to the beginning of the beginning of the second do loop 416. If on the other hand N is found to be equal to K then the process continues with process block 436 which is the outer do loop termination test. If in process block 436 M is found to be not equal to K-1 then the process loops back to the beginning of the first outer loop 414. If on the other hand M is found to be equal to K-1 then the process terminates.

In the part of process 400 shown in FIG. 4B, different combinations of two columns are checked to determine if two orders in the two columns can be exchanged in order to better balance the numbers of labels in the two columns. To check each combination of two columns, first the difference between the total number of labels in the two columns is calculated, then the difference in the number of labels in different combinations of orders (one taken from each column) is calculated, and the boolean expression above is evaluated. If TRUE then the two orders are exchanged between the two columns. The process 400 shown in FIG. 4 serves to provided columns of labels that are nearly balanced. The order array is altered according to the exchanges performed in the second part of process 400.

Receiving Operator Inspection Results and Marking Labels as Failed

Figure 8:
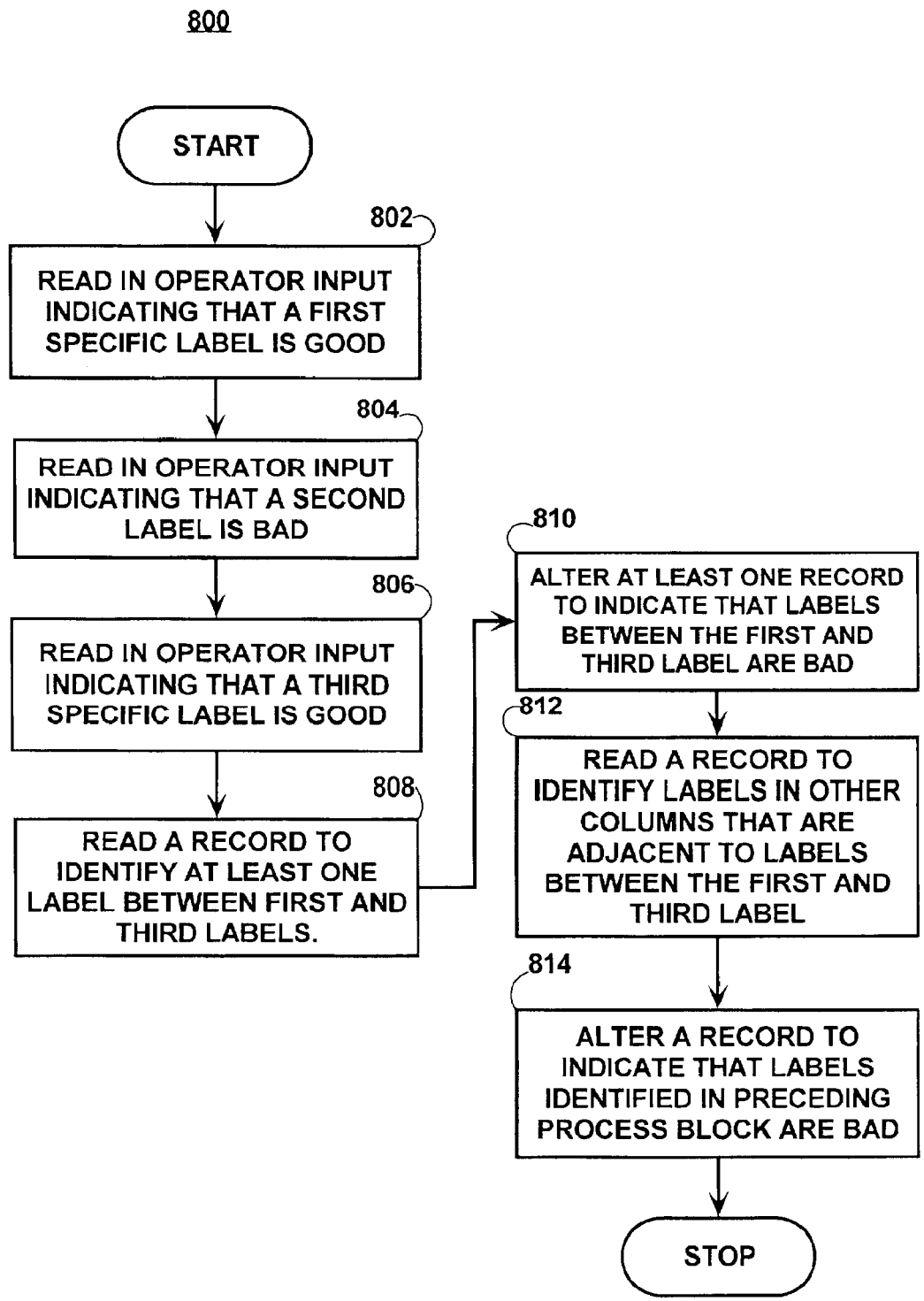
FIG. 8 is a flow diagram of a print quality feedback process performed by the printer control server shown in FIG. 1 according to a preferred embodiment of the invention.

FIG. 8 is a flow diagram of process performed by the printer control server shown in FIG. 1 according to a preferred embodiment of the invention. In process block 802, operator input indicating that a specific first label is good is read in. The operator can input the indication by scanning the unique bar code 606 on the first label and scanning a 'good label' bar code born on one of the palettes 210 or 324. An operator can monitor the label production process at various points (e.g., on the inspection station 208, after the coating applicator 302, after the coating curing station 304, or after the label die cutter). In process block 804 operator input indicating that a second label is bad is read in. The operator can input the latter input by scanning an error bar code on one of the palettes 210 or 324. In one illustrative embodiment, error bar codes include 'Printer Media Damage', 'Web Break before Slitter', 'Varnishing Defect', 'Die-Cut Damage Matrix Removal Damage', and 'Slitting Damage'. (Other error codes can be provided for declaring all the labels on a spool or reel bad.) In process block 806, operator input indicating that a third specific label is good is read in. The input of process block 806 can take the form of reading the 'good label' bar code on one of the palettes 210, 324, and reading the bar code on the third specific label. The first second and third labels need not be in the same column.

In process block 808, a record is read to identify at least one label between the first and third labels. These records can be in multiple columns. The record that is read can be the 'layout array' discussed below. In process block 810 at least one record is altered to indicate that all the labels between the first and third record are bad. In process block 812, a record is read to identify labels in columns other than the column(s) including the first and third label, which are adjacent to labels between the first and third label. The record read in process block 812 can be the layout array. In process block 814, a record is altered to indicate that the labels identified in process block 812 are bad. As an alternative to marking labels between the first and third labels, and labels adjacent to those as bad, all orders which overlap the region between the first and third label can be considered bad. In the latter case order IDs would be read from the 'layout array' to identify orders that are to be considered bad. Rather than altering records maintained on the printer control server 106 (as is done in process block 812 and 814), information identifying bad records can be communicated to the second server 102 directly. The second server 102 can then send new orders for labels to the printer control server 106.

Tracking Labels

Figure 9A:
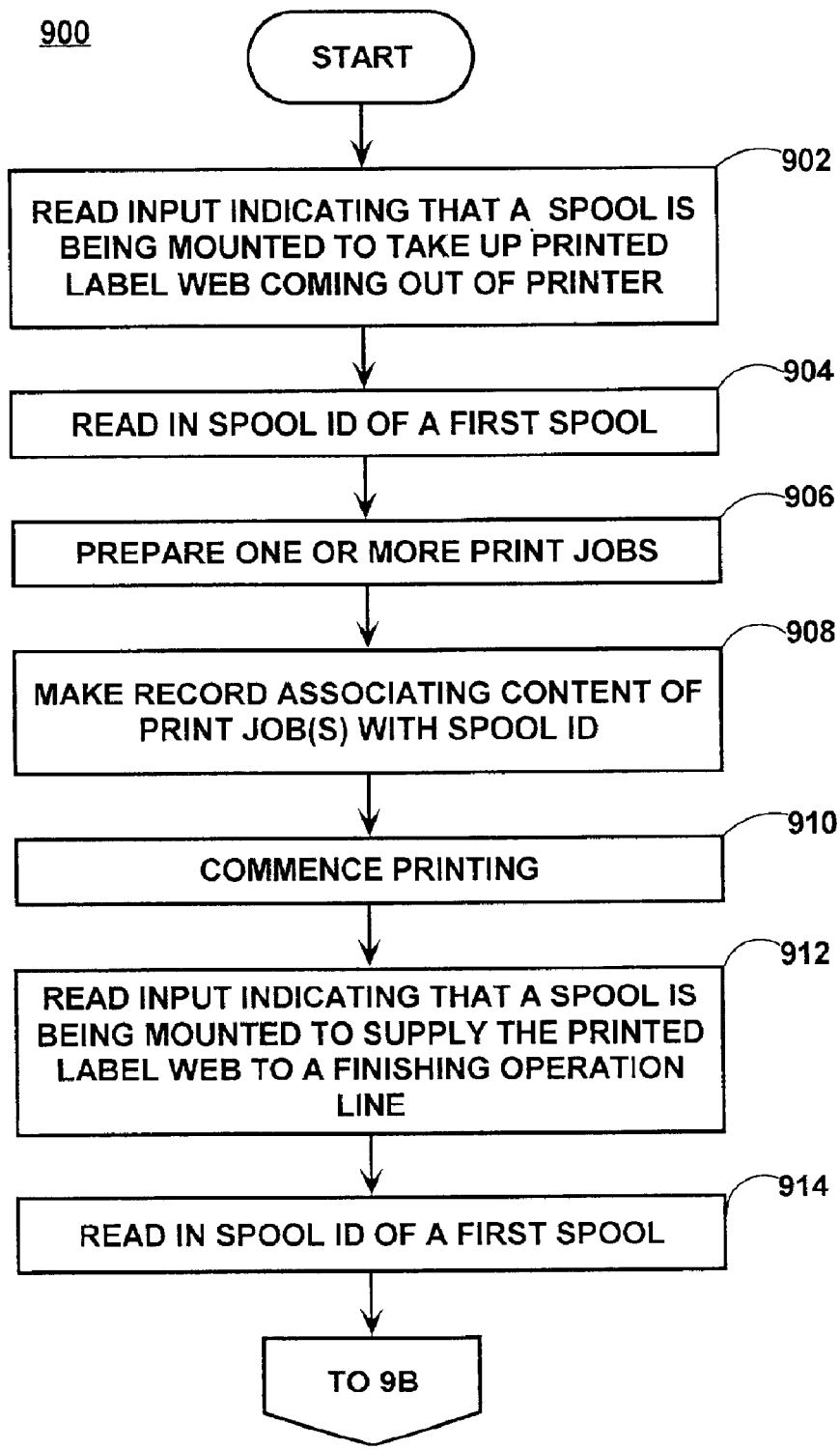
FIG. 9A shows a first part of a flow diagram of a label tracking process performed by the printer control server shown in FIG. 1 according to a preferred embodiment of the invention.
Figure 9B:
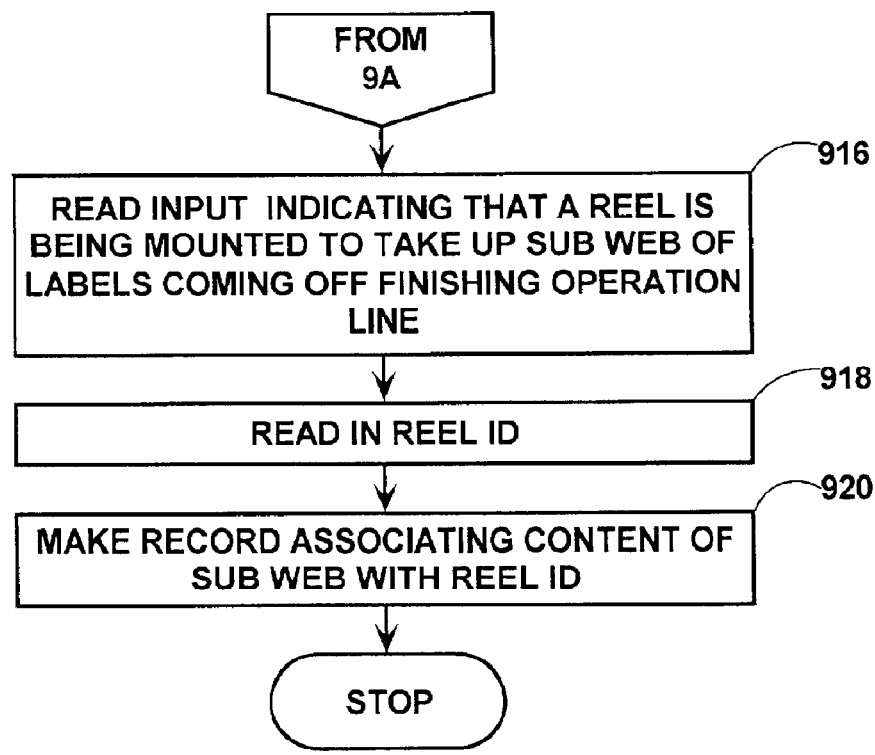
FIG. 9B shows a second part of the flow diagram shown in FIG. 9A.

FIG. 9A and FIG. 9B show a flow diagram of a process 900 performed by the printer control server 106 shown in FIG. 1 according to a preferred embodiment of the invention. This process serves to track the location of each label.

In process block 902 an input indicating that a spool 216 is being mounted to take up the web 222 coming out of the printer 108 is read in. The input preferably takes the form of a bar code on the palette 210, and is read in using the wand 118.

In process block 904 a spool ID of a first spool is read in. Preferably the spool ID is read in by scanning the spool ID bar code label 224 with the wand 118. Alternatively, the operator enters a spool ID through the first 112 or second 114 operator interface clients. In response to receiving signals derived from the spool ID and the code indicating that a spool is being mounted, the second client 114 transmits signals to the printer control server 106 indicating that the first spool is being mounted to take up the web 222. In process block 906 one or more print jobs are prepared. The print jobs preferably include a plurality of orders, each of which includes a plurality of labels. The content of each print job in terms of the identity of the orders it contains and/or the identity of the labels it contains is stored in a memory (e.g. a hard drive in the printer control server 106 or the second server 102). In process block 908 a record associating the content of the print job(s) with the first spool, as identified by the spool ID, is made. In process block 910 printing is commenced. After the printing onto the web 222 is completed, the process block 912 is executed. In process block 912 input that indicates that a spool is being mounted to supply the printed label web to a finishing line is read in. The finishing line preferably comprises the coat-cut line 300. The input is preferably generated by scanning a "spool mount" bar code on palette 324 with wand 118. In process block 914 the spool ID of the first spool is read in once again. In response to receiving signals derived from the spool ID, and the "spool mount" bar code, the second client 114, transmits signals to the printer control server 106 indicating that the first spool is being mounted at the finishing line. In process block 916, input indicating that a reel is being mounted to take up a sub web of labels coming off the finishing operation line is read in. The input is preferably generated by scanning a specific "reel mount" bar code on palette 324. In process block 918 a reel ID of a reel being mounted to take up the sub web is read in. The reel ID is preferably read in by scanning a reel ID bar code 330, 332, or 334 with the wand 118. Process blocks 916, and 918 are be repeated for each reel 310, 312, and 314. Separate "reel mount" bar codes on palette 324 are provided for specifying each of the plurality of reel positions (e.g. the upper, middle, and lower positions of reels 310, 312, 314). Note that in this embodiment the web 222 is slit in two place for printing three labels across on the web 222, and three reels are then used to take up the sub webs 316, 318, and 320. In process block 920, a record is made by the printer control server 106 associating the content of a portion of the print job printed on one of sub webs 316, 318 or 320, with a corresponding reel identified by the reel ID. The record can be made by copying a column corresponding to the sub web from the order arrays for each print job printed on the web 222. Process block 920 can be repeated for each sub web and corresponding reel ID. Process 900 serves to track the location, i.e., identify the carrier, (e.g., spool, reel, container) of a particular orders and labels as they move from one processing line to another, (e.g., as they are moved from the printing line 200 to the coat cut line 300). This is especially useful to avoid losing track of printed output in a production environment in which at any given time there are multiple spools waiting for final processing. Although process 900 has been described as it would be applied to a two line label production system, it could be adapted to a system which has more than two lines. For example the coat-cut line 300 could be split up into two separate lines, in which case process 900 would be adopted to track the labels as they are carried on three separate carriers, e.g. two spools, and one reel (for each sub web, if the web is slit). Input received in process blocks 902, 912, and 916 can alternatively be input directly at the first or second clients 112, or 114 (e.g., by operating a Graphical User Interface (GUI)).

Reserving Space for Trailer

Figure 10:
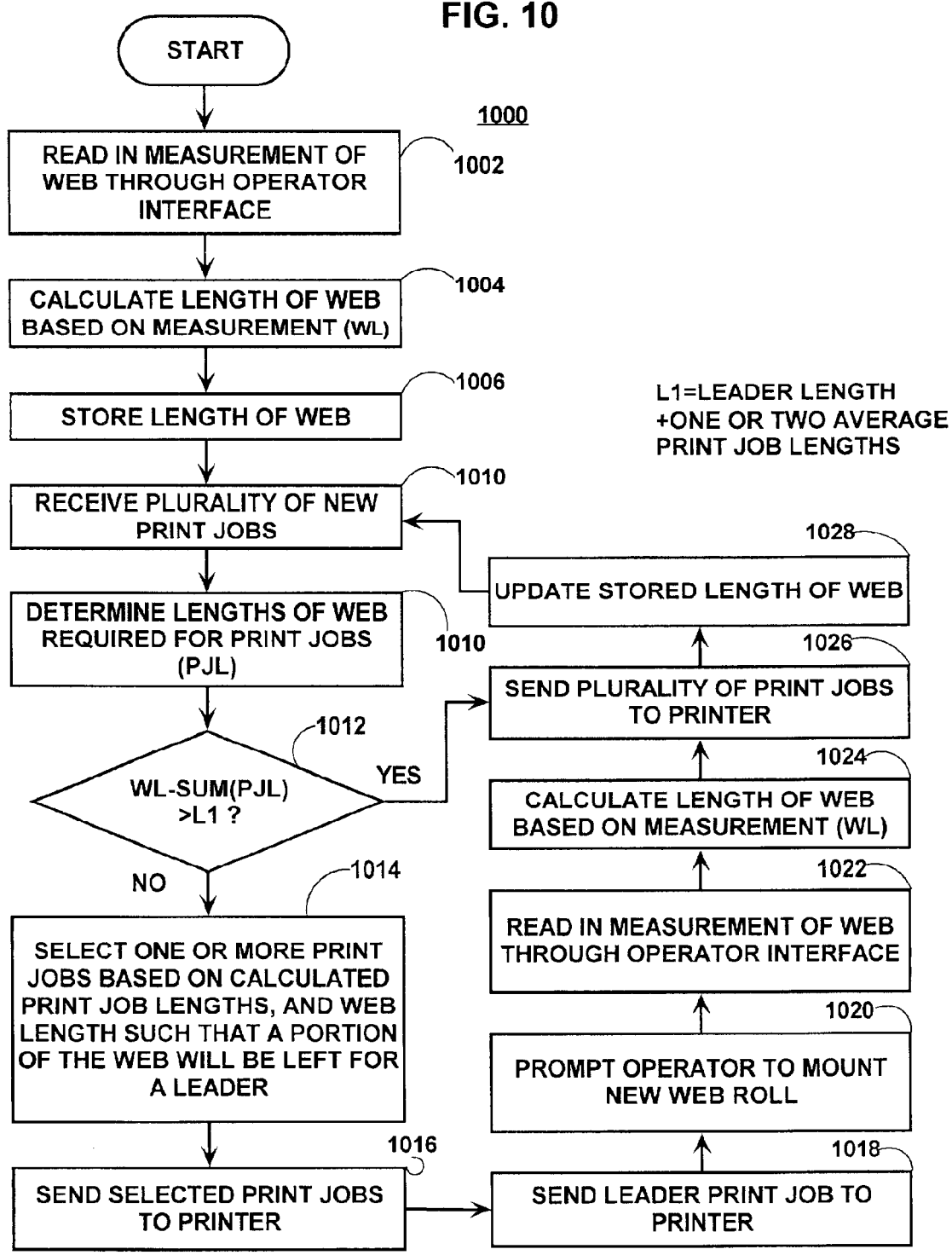
FIG. 10 is a flow diagram of a process for reserving a length of web to be used as a trailer according to a preferred embodiment of the invention.

FIG. 10 is a flow diagram of a space reservation process 1000 performed by the printer control server 106 shown in FIG. 1 according to a preferred embodiment of the invention. The process serves to control the printer 108 so as to reserve a leader portion at the end of the web 222 to be used as a leader for threading the web through the coat-cut line 300.

In process block 1002 a measurement of the web available to the printer 108 is read in. The measurement may be entered at the first or second operator interface clients 112 or 114. The measurement is preferably a measurement along a diameter of supply roll 202 from a roll core 226 to a periphery 228 of the roll 202. Alternatively, the measurement can be a measurement of the length of the web, in which case process block 1004 is unnecessary. In process block 1004 the length of the web (WL) on the roll 202 is calculated. The length of the web can be calculated using the following expression:

$$\frac{\pi(CD + D^2)}{TH}$$

where, TH is the thickness of the web material,

C is the outer radius of a core of the supply roll, and

D is the distance measured along the diameter between the core 226 and the periphery as indicated in FIG. 2, Alternative variations can be derived based on various measurements using elementary mathematics. Further, a measurement of the length of web available to the printer can read from a memory, e.g. hard disk included in the printer control server 106.

In process block 1006, the length of the web is stored in a memory associated with the printer control server 106. In process block 1008 a plurality of new print jobs are received. In process block 1010 the lengths of media (PJL) required for the new print jobs is determined. The determination may be based on an examination of the content of each print job which determines the numbers, and dimensions of various types content (e.g. pages, labels) and applies a summation process to determine the overall length of web required for the print job. Examination of the content of each print job can include reading the order array for each print job.

Process block 1012 is a decision block the outcome of which depends on whether the available web length (WL) minus the sum of the print job lengths (PJL) exceeds a certain predetermined value L1. Subtracting the sum of the print job lengths from the web length is one way of comparing the lengths of the print jobs to the length of the web. L1 is set to at least the length required for a leader portion. L1 is preferably set to the length required for a leader portion plus the average length of print jobs printed by the printer 108. If L1 is smaller than the aforementioned difference, then the process continues with process block 1026 in which the plurality of new print jobs are sent to the printer 108. In process block 1028, the length of the web stored in memory is updated based on the amount required to print the plurality of print jobs, after which the process loops back to process block 1008.

If L1 is not smaller than the aforementioned difference, then the process continues with process block 1014 in which one or more printed jobs are selected based on their associated print job lengths (PJL), and the web length (WL) such that if they are printed a portion of the web will be left for a leader. Sums of different subsets of the plurality of print jobs can be subtracted from the web length and compared to L1 or a second predetermined value to determine a subset that can be sent to the printer 108 while still reserving the length required for the leader.

Thereafter, in process block 1016 the selected print jobs are sent to the printer, and in process block 1018 a leader print job is sent to the printer.

In process block 1020, the operator is prompted to mount a new web roll 202 on the print line. This can be accomplished by displaying a message at the first and second operator clients 112 and 114. In process block 1022, a measurement of the new web is read in through one of the operator interface client 112 or 114, and in process block 1024 the length of the web 222 on the new roll 202 is read in, as was done in process block 1002. In process block 1026 the print jobs remaining from the plurality of print jobs received in process block 1008 (which were not sent to the printer 108 in process block 1016) are sent to the printer 108. The process 100 then continues to process block 1028, and continues from there as described above, until terminated by an external process. Note that print jobs can be being continually received by printer control server 106 and stored in a memory, e.g. hard drive, until they are read in process block 1008. Process block 1008 can be initiated by operator input through one of the clients 112 or 114.

Process 1000 provides a method whereby the web 222 which bears a plurality of unique printed labels is provided with a leader portion to be used in threading the web onto a web fed line.

For label manufacturing systems which include more than one web fed line in addition to the print line 200, it is preferable to also reserve a predetermined length at the beginning of the web to be used as a leader portion. By this measure, it is ensured that there will be a leader portion that can be used each time the web is threaded through one of the additional web fed lines, without damaging the plurality of unique labels printed on the web.

System for Composing Custom Labels

Figure 11:
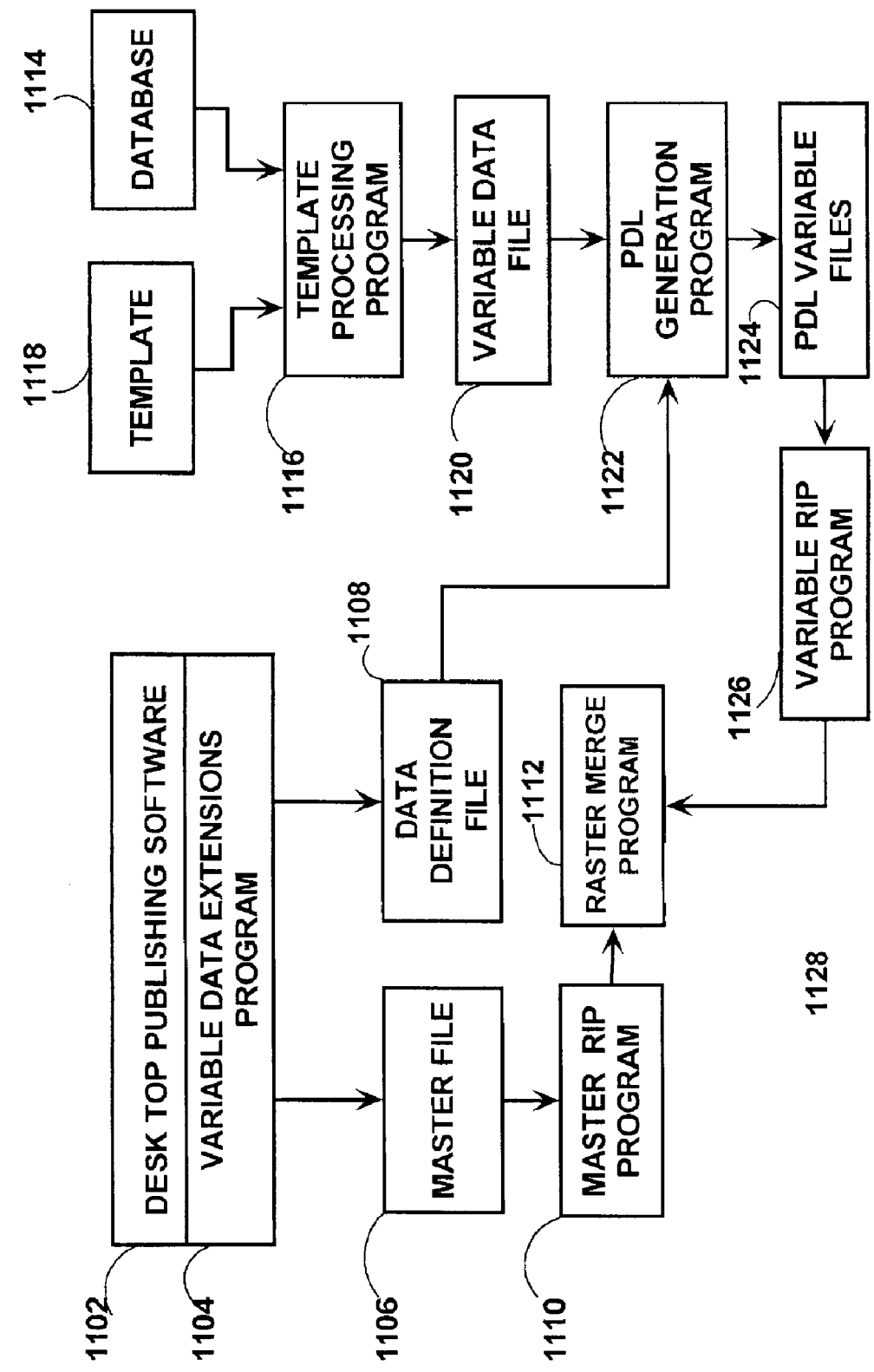
FIG. 11 is a block diagram depicting functional interrelationships between software components according to a preferred embodiment of the invention.

FIG. 11 is a block diagram 1100 depicting functional interrelationships between software components for generating custom label print files according to a preferred embodiment of the invention.

Referring to FIG. 11, desk top publishing software 1102 is provided. Preferably Quark Express sold by Quark of Denver, Colo. or Adobe Pagemaker shop sold by Adobe of San Jose, Calif. is used as the desktop publishing software 1102. The desk top publishing software 1102 is extended by a variable data extension program 1104. The desktop publishing software augmented by the variable data extension program 1104 allows a user to insert place markers in a document being composed using the desktop publishing software 1102. The desk top publishing software 1102, augmented by the variable data extension program 1104, outputs two files. A first output file is a master file 1106 which includes all the non variable content of the document composed using the desk top publishing software. The place markers indicate positions at which document specific rasterized content will be inserted into a rasterized version of the master document. The master file is preferably in a page description language (PDL) format such as PostScript. A second output file is a data definition file 1108. The data definition file specifies the format of variable content which will be inserted (in rasterized form) at places determined by the place markers. For example, the data definition file can specify that the text to be inserted at place markers is formatted in groups of comma delimited strings separated by hard returns. The variable data extension program 1104 generates dialog boxes through which a user can indicate the format of data associated with each place marker in the document, (e.g., comma quote delimited text). The indicated formats will then be compiled by the variable data extensions 1104 and output to the data definition file 1108. In combination with Quark Xpress or Adobe Pagemaker, IBM Data Extensions sold by IBM of Boulder, Colo. are preferably used. The postscript master file 1106 is input to a master raster image processing (RIP) program 1110. The output of the master RIP program 1110 is input to raster merge program 1112.

Variable data to be inserted into multiple versions of the document during a merge operation is extracted from a database 1114, by a template processing program 1116, in accordance with instructions contained in a template 1118, and output as a variable data file 1120. The variable data file 1120 which preferably consists of text is processed by the page description language (PDL) conversion program. The PDL conversion program converts the variable data file 1120 into a PDL format data. One example of a PDL format is the Postscript format. PDL format data is input to a variable image RIP program 1126. Rasterized output from the variable image RIP program 1126 is input to the raster merge program 1112. The format of printed articles can be easily altered by editing the template, without having to change program (e.g., java) code.

Template Processing

The following is an exemplary excerpt from a template 1118.

~row=1~~col=1~
An Example of Fixed text, no quotes are necessary.
~account_name~
~Block=On~~address_line_1~~address_line_2~~address_line_3~
~address_line4~~address_line5~~phone_no~~Block=Off~
~email_id~
~label_id,font_name_1~
~label_id~
~sku, bar_code~
~lot_no,font_name_2~

Templates include three types of tokens: fixed text, field names, and settings. Fixed text is passed on to the generated variable data file 1120 unchanged. Field names are looked up and replaced with the value from the database 1114 for that field. Settings are used to indicate the row and column of a logical page within a page, (e.g. in the case of printing 4 post card size labels per letter size area of the web 222). Field names and settings are not case sensitive. The tilde "~" character is used to indicate the start and end of a field name or setting. Field names can be followed by a comma and a function name, The function name can correspond to a function which extracts data from the database and validates, and or formats the data (e.g. encloses it within parenthesis). A bar code function can be used to transform numeric data from the database into a form suitable for rendering as a bar code. The template is preferably a text file.

"Infoprint Manager" software by IBM, the assignee of the present invention includes a PDL generation program 1122. Software for the "Infocolor 70" printer sold by IBM includes all those blocks enclosed within the dashed polygon 1128 including the master RIP program 1110, the raster merge program 1112, and variable RIP program 1126. These components, the variable desk top publishing software 1102, the variable data extensions program are preexisting components which the inventors have used, in following the modern software development practice in which new programs interact with and rely on preexisting programs which may have taken hundreds of man-years to write. Thus we will not attempt to teach the internal workings of those components, rather we identify them by their function. One of ordinary skill in the art can select software to serve the functions of the various blocks shown in FIG. 11, and integrate that software.

Figure 12A:
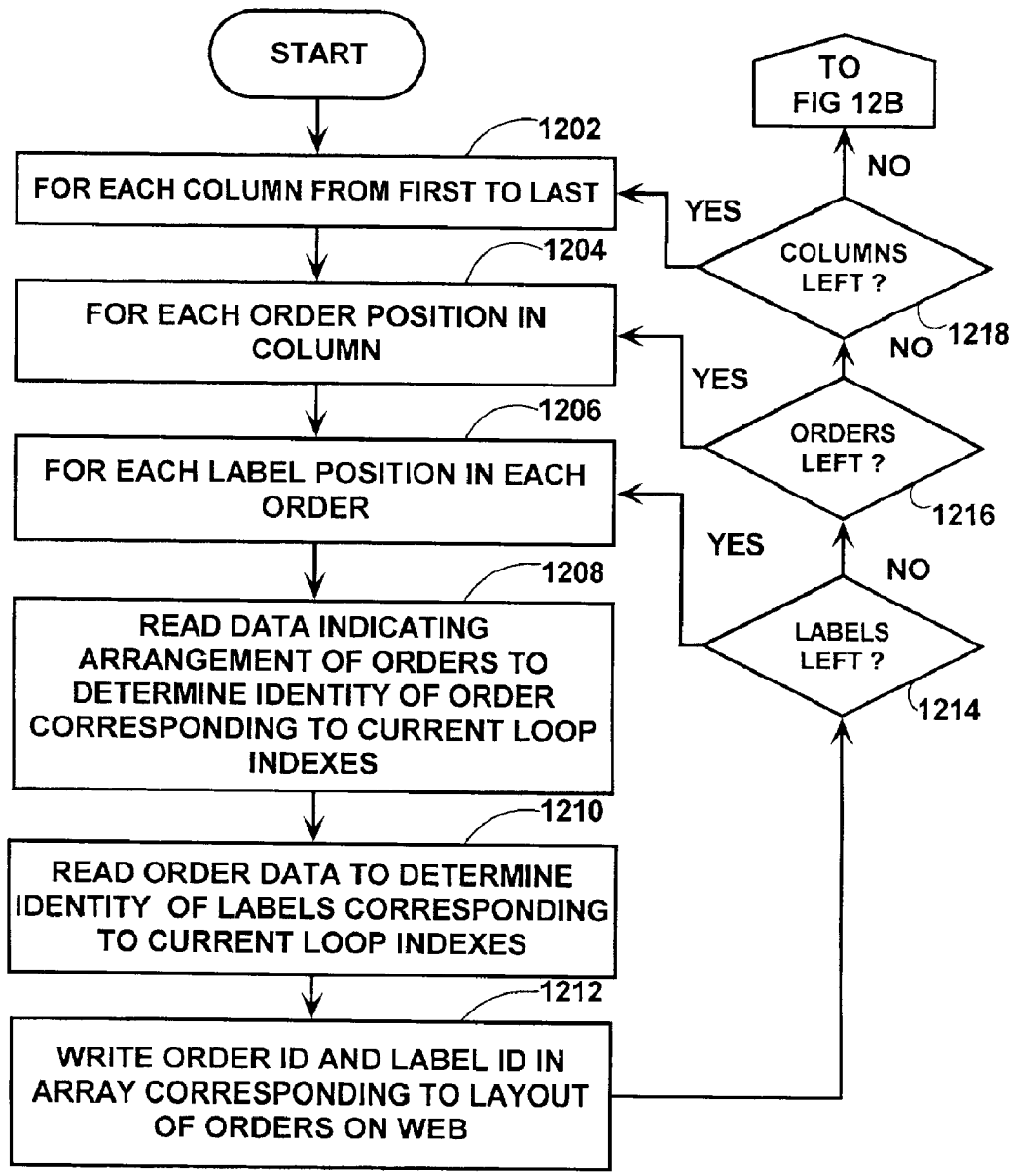
FIG. 12A is a first part of a flow diagram of process performed by a template processing program according to a preferred embodiment of the invention.
Figure 12B:
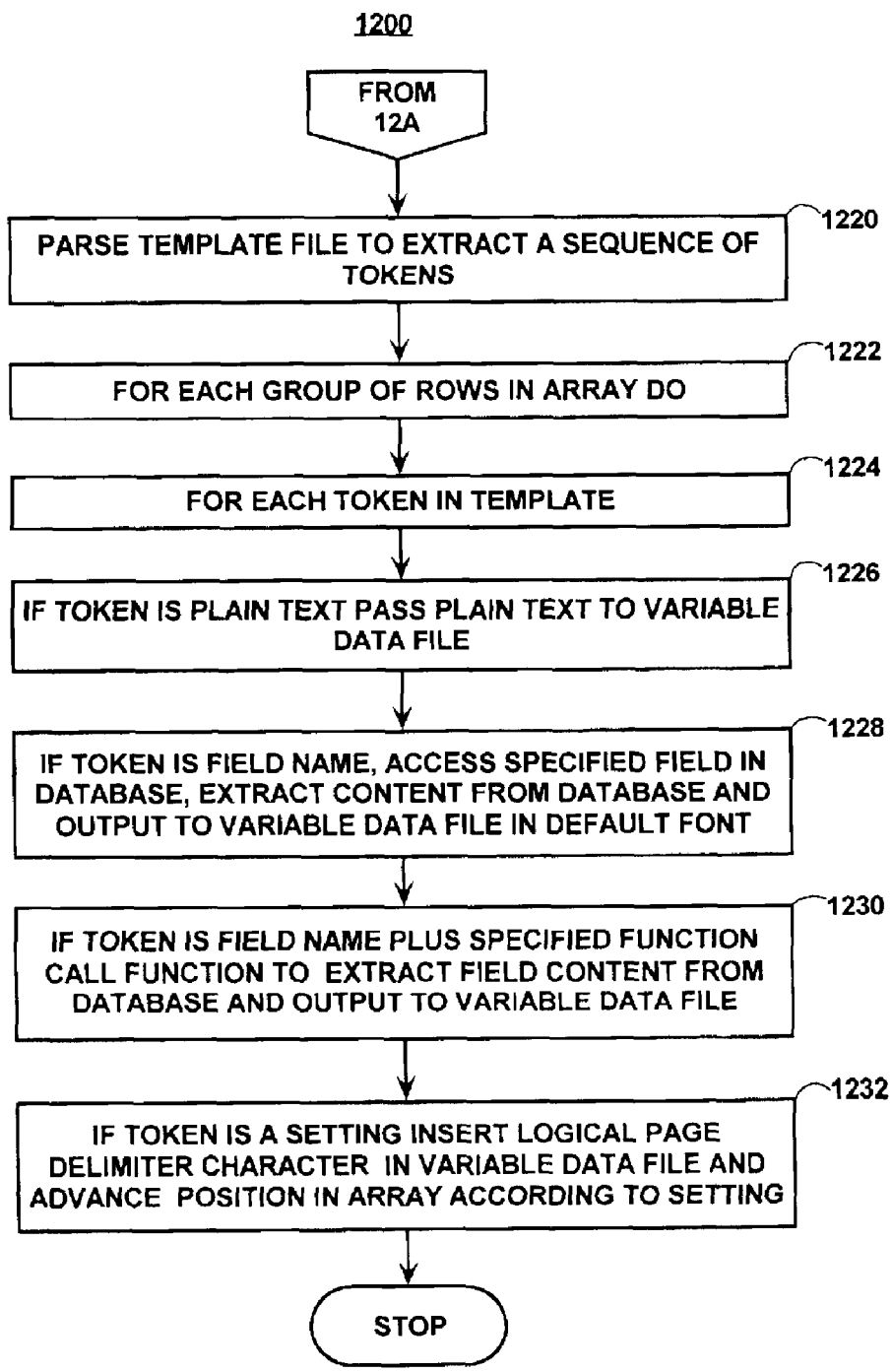
FIG. 12B is a second part of the flow diagram shown in FIG. 12A.

FIG. 12 is a flow diagram of a process 1200 performed by template processing program 1116 according to a preferred embodiment of the present invention. Process block 1202 is the beginning of a first loop which indexes a column number. Process block 1204 is the beginning of a second loop nested within the first loop which indexes an order number. Process block 1206 is the beginning of a third loop which indexes a label (or other printed article) number. In process block 1208 data which indicates an arrangement of orders, (e.g. the above mentioned order array) is read to determine the identity (e.g. name or serial number) of an order corresponding to current index values for the first and second loops. In process block 1210 order data (e.g., the above mentioned order-label array) is read to determine the identity of a label corresponding to current values of the first, second, and third loop indexes. In process block 1212 the identity of the label (label ID, or more generally printed article ID) and order (order ID) corresponding to the current values of the first, second, and third indexes is written to an array referred to as a 'layout array'. The layout array is two dimensional and corresponds, by label identity, to the layout of labels to be printed on the web 222, or other printing medium. Each entry of the array includes an order ID and label ID for a particular label corresponding to the entry. The layout array could be realized as two separate arrays-one for the order ID and one for the label ID. The columns and rows of the array preferably correspond to the columns and rows in which printed articles are to be printed on the web 222. In order to determine the row number of a specific label, the number of labels in all the orders preceding the specific label order are summed and added to a number indicating the position of the specific label in its order. This can be done using the above mentioned 'order-label' arrays.

Process blocks 1214, 1216, and 1218 are termination tests for the third, second, and first loops respectively. After the first loop runs through all the columns the array will have been filled in, and the process continues with process block 1220. In process block 1220 a template file is parsed to extract a sequence of tokens.

Process block 1222 is the beginning of a loop which goes through successive groups of rows in an array. Although it is the web 222 that is being printed on, the raster merge program 1112 will ordinarily be designed to process one page at a time. In the present case a page, corresponds to a section of the web. Therefore, groups of rows of the array may be processed in order to provide data for successive sections of the web. The template contains settings which indicate relative positions within the array. Successive settings in the template will be used to determine the next array entry to be used within a group of rows corresponding to a section of web. For example, if each section of web corresponds to four post card size labels, then a corresponding array would have two columns, and each group of rows would have two rows. The template would have four settings (i.e., ~row=1~~col=1~; ~row=1~~col=2~; ~row=2~~col=1~; ~row=2~~col=2~) with fixed text and field names following each.

Process block 1224 is the beginning of a loop which sequentially goes through each token in the template. If the token is fixed text then, in process block 1226, it is passed to the variable data file 1120. If the token is a field name, then in process block 1228 data specified by the label ID, and/or specified by the order ID, and field name is retrieved from the database 1114 and output to the variable data file 1120 in a default font. The order ID, and label ID are used to select a corresponding record in the database. If the token is a field name plus a function name then, in process block 1230, the named function is called to retrieve data from the database 1114, and output it to the variable data file 1120. The named function can include programming steps for validating the data retrieved from the database 1114, transforming the data in some way (e.g. in the format required for bar coding), formatting the data (e.g. by placing the data within parenthesis), or adding a font name. The font name will be interpreted by the PDL generation language. Bar code fonts can be used to write bar code 606. If the token is a setting then, in process block 1232, a logical page delimiter character is inserted in variable data file 1120 and the position in array is advanced according to the setting. For example, if the previous setting was ~row=1~,~col=1~ and the new setting is ~row=1~,~col=2~, the array entry in the same row and the next column is accessed to retrieve the column ID and row ID Page delimiter characters can also be inserted in the variable data file 1120 after each group of rows has been processed. The ~block=on~ and ~block=off~ token are special control tokens. The text extracted based on all the field name tokens and plain text that come between the ~block=on~ and ~block=off~ tokens will be formatted in the variable data file 1120 as a block of text with no empty lines. Referring to the above template example if the address_line_5 field in the database 1114 is null for a particular record, data from the phone_numberfield will follow immediately afterdata from the address_line_4 field without an empty line between. This serves to produce an aesthetically pleasing text layout.

The present invention can be produced in hardware or software, or in a combination of hardware and software. The system, and method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means.

According to the inventive principles as disclosed in connection with the preferred embodiment, the invention and the inventive principles are not limited to any particular kind of computer system but may be used with any general purpose computer arranged to perform the functions described and the method steps described. The operations of such a computer, as described above, may be according to a computer program contained on a medium for use in the operation or control of the computer. The computer readable medium which may be used to hold, contain or deliver the computer program product, may be a fixture of the computer such as an embedded memory or may be on a transportable medium such as a disk, as would be known to one of ordinary skill in the art.

The present invention is not limited to any particular computer program or logic or language, or instruction but may be practiced with any such suitable program, logic or language, or instructions as would be known to one of ordinary skill in the art. Without limiting the principles of the disclosed invention any such a computer system can include, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method of generating a custom printed article print file, the method comprising the steps of:

generating a master file that includes all non variable content of the custom printed article and place markers that indicate positions at which document specific content is to be inserted, the master file being in a page description language;

generating a data definition file that specifies format of the document specific content that is to be inserted at the positions indicated by the place markers in the master file;

reading a template including a plurality of tokens, at least one of the tokens indicating a field in a database;

identifying a record in the database using a printed article ID;

extracting data from the field of the record which is specified by the one token;

outputting the data to a variable data file;

using the data definition file in converting the variable data file to a PDL variable file, the PDL variable file being in the page description language;

processing the master file so as to generate the non variable content in rasterized form;

processing the PDL variable file so as to generate the document specific content in rasterized form; and merging the document specific content in rasterized form with the non variable content in rasterized form so as to produce the custom printed article print file.

2. The method according to claim 1 further comprising the step of:

incrementing an index to point to a second printed article ID in response to reading a second token in the template.

3. The method according to claim 1 further comprising the step of:

outputting plain text included in a third token read from the template to the variable data file.

4. The method of claim 1 wherein the step of identifying a record in a database comprises the step of:

using an order ID and the printed article ID to identify the record in the database.

5. The method according to claim 1 further comprising the step of:

producing an array of printed article IDs, in which the printed article IDs are arranged in order corresponding to the layout of corresponding printed articles on a printing medium.

6. The method according to claim 5 further comprising the steps step of:

incrementing an index to point to a second printed article ID in the array in response to reading a second token in the template.

7. The method of claim 1 further comprising the step of:

generating a data structure comprising a plurality of entries, each of which includes a printed article ID.

8. The method according to claim 1 further comprising the step of:

calling a function specified by a function named in the one token to process the data that was extracted from the field of the record specified by the one token before outputting the data to the variable data file.

9. The method according to claim 8 wherein processing performed by the function comprises a sub-step of:

validating the data.

10. The method according to claim 8 wherein processing performed by the function comprises a sub-step of:

formatting the data.

11. The method of claim 1 further comprising the step of:

generating an array having a number of columns equal to a number of columns in which printed articles are printed on a web, and a number of rows equal to a number of rows of printed articles to be printed on the web, in which each array entry includes a order ID and a printed article ID.

12. The method according to claim 11 wherein the step of generating the array comprises the sub-steps of:

for each column in which articles are to printed on a web:

reading a first data structure which indicates a layout of groups of printed articles on the web to identify a group of printed articles at a group position on the web;

reading a second data structure which indicates an arrangement of printed articles within the group of printed articles to identify a printed article at a printed article position within the group;

writing a printed article ID to an array which corresponds to the layout of printed articles on the web based on information read from the first and second data structures.

13. A computer readable medium containing programming instructions for generating a custom printed article print file, the computer readable medium including programming instructions for performing the steps of:

generating a master file that includes all non variable content of the custom printed article and place markers that indicate positions at which document specific content is to be inserted, the master file being in a page description language;

generating a data definition file that specifies format of the document specific content that is to be inserted at the positions indicated by the place markers in the master file;

reading a template including a plurality of tokens, at least one of the tokens indicating a field in a database;

identifying a record in the database using a first printed article ID;

extracting data from the field of the record which is specified by the one token;

outputting the data to a variable data file;

using the data definition file in converting the variable data file to a PDL variable file, the PDL variable file being in the page description language;

processing the master file so as to generate the non variable content in rasterized form;

processing the PDL variable file so as to generate the document specific content in rasterized form; and merging the document specific content in rasterized form with the non variable content in rasterized form so as to produce the custom printed article print file.

14. The computer readable medium according to claim 13 wherein the programming instructions further include programming instructions for performing the step of:

generating a array having a number of columns equal to a number of columns in which printed articles are printed on a web, and a number of rows equal to a number of rows of printed articles to be printed on the web, in which each array entry includes a order ID and a printed article ID.

15. A system for producing custom printed articles comprising:

a high speed printer;

a computer electrically coupled to the high speed printer, the computer supplying a custom printed article print file to the high speed printer, the computer including;

a means for generating a master file that includes all non variable content of the custom printed article and place markers that indicate positions at which document specific content is to be inserted the master file being in a page description language;

a means for generating a data definition file that specifies format of the document specific content that is to be inserted at the positions indicated by the place markers in the master file;

a means for reading a template including a plurality of tokens, at least one of the tokens indicating a field in a database;

a means for identifying a record in the database using a first printed article ID;

a means for extracting data from the field of the record which is specified by the one token;

a means for outputting the data to a variable data file, a means for using the data definition file in converting the variable data file to a PDL variable file, the PDL variable file being in the page description language;

a means for processing the master file so as to Generate the non variable content in rasterized form;

a means for processing the PDL variable file so as to generate the document specific content in rasterized form; and a means for merging the document specific content in rasterized form with the non variable content in rasterized form so as to produce the custom printed article print file.

16. A system for producing custom printed articles comprising:

a high speed printer;

a computer electrically coupled to the high speed printer, the computer supplying a custom printed article print file to the high speed printer, the computer including:

a processor programmed to:

generate a master file that includes all non variable content of the custom printed article and place markers that indicate positions at which document specific content is to be inserted, the master file being in a page description language;

generate a data definition file that specifies format of the document specific content that is to be inserted at the positions indicated by the place markers in the master file;

read a template including a plurality of tokens, at least one of the tokens indicating a field in a database;

identify a record in the database using a first printed article ID;

extract data from the field of the record which is specified by the one token;

output the data to a variable data file;

use the data definition file in converting the variable data file to a PDL variable file, the PDL variable file being in the page description language;

process the master file so as to generate the non variable content in rasterized form;

process the PDL variable file so as to generate the document specific content in rasterized form; and merge the document specific content in rasterized form with the non variable content is rasterized form so as to produce the custom printed article print file.

* * * * *